United States Patent
Gushiken

(10) Patent No.: US 6,731,924 B2
(45) Date of Patent: May 4, 2004

(54) APPARATUS AND METHOD FOR CONTROLLING DATA TRANSFER TRANSMITTED VIA RADIO COMMUNICATION APPLICABLE TO ELECTRONIC EQUIPMENT AND ELECTRONIC EQUIPMENT COMMUNICATION SYSTEM

(75) Inventor: Hajime Gushiken, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 416 days.

(21) Appl. No.: 09/726,505

(22) Filed: Dec. 1, 2000

(65) Prior Publication Data

US 2001/0041587 A1 Nov. 15, 2001

(30) Foreign Application Priority Data

Dec. 2, 1999 (JP) ............................................. 11-343201

(51) Int. Cl.$^7$ ................................................. H04B 1/16
(52) U.S. Cl. .................... 455/343.1; 455/574; 713/320; 370/311
(58) Field of Search .............................. 455/343.1, 574, 455/557; 340/7.32, 693.3; 370/311; 713/310, 324, 323, 320

(56) References Cited

U.S. PATENT DOCUMENTS

| | | | | |
|---|---|---|---|---|
| 5,054,052 A | * | 10/1991 | Nonami | 455/574 |
| 5,128,938 A | * | 7/1992 | Borras | 370/311 |
| 5,150,361 A | * | 9/1992 | Wieczorek et al. | 370/311 |
| 5,519,757 A | | 5/1996 | Torin | |
| 5,790,946 A | * | 8/1998 | Rotzoll | 455/41 |

FOREIGN PATENT DOCUMENTS

| | | | |
|---|---|---|---|
| JP | 408088702 A | * | 4/1996 |
| JP | 408247797 A | * | 9/1996 |
| JP | 10-97477 | | 4/1998 |

* cited by examiner

Primary Examiner—Marsha D. Banks-Harold
Assistant Examiner—Nghi H. Ly
(74) Attorney, Agent, or Firm—Finnegan, Henderson, Farabow, Garrett & Dunner, L.L.P.

(57) ABSTRACT

An apparatus and method for controlling the transfer of data that are received and arranged in a radio communication unit in electronic equipment, such as a personal computer or a communication terminal, to a data processing device in the electronic equipment. The radio communication unit in the personal computer or the communication terminal includes a buffer memory for storing the arranged data and a function of determining the operating state of the personal computer or the data processing unit in the personal computer when the radio communication unit detects the receipt of data via radio communication.

12 Claims, 9 Drawing Sheets

FIG.1
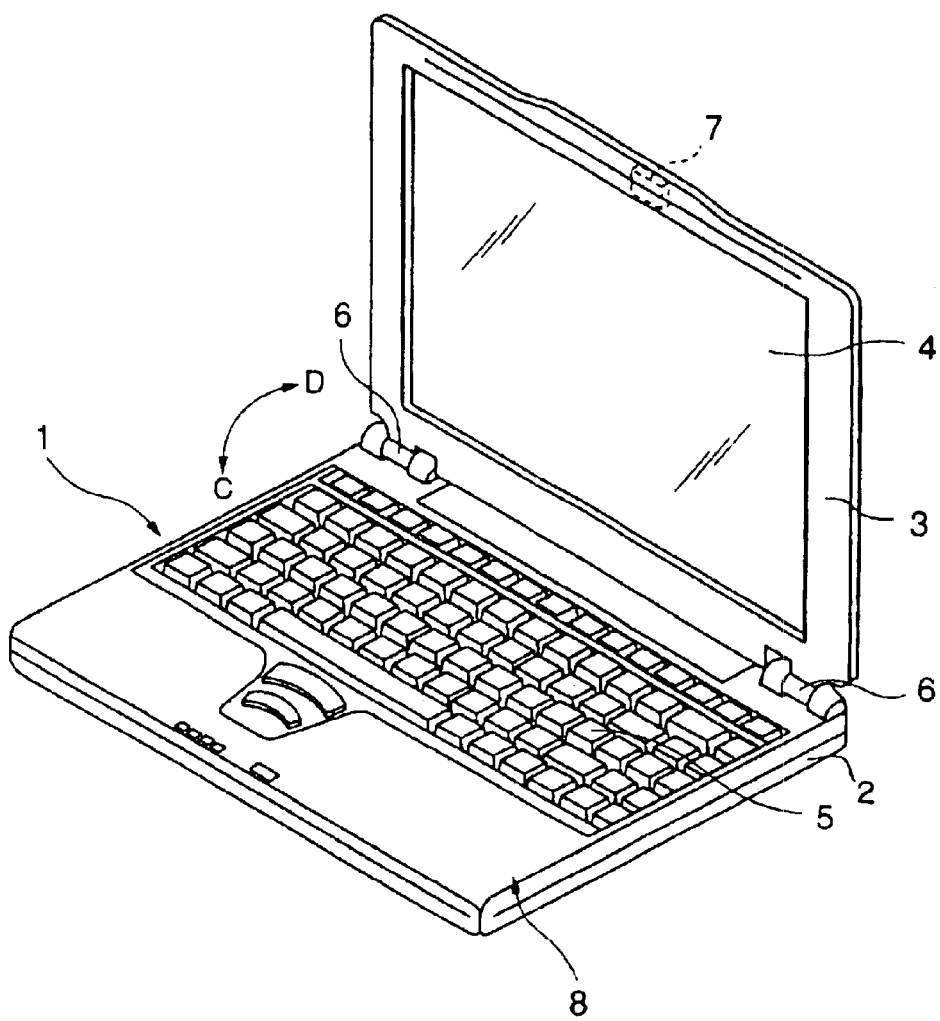
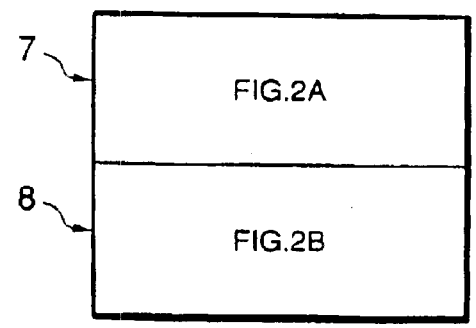

APPARATUS AND METHOD FOR CONTROLLING DATA TRANSFER TRANSMITTED VIA RADIO COMMUNICATION APPLICABLE TO ELECTRONIC EQUIPMENT AND ELECTRONIC EQUIPMENT COMMUNICATION SYSTEM

BACKGROUND OF THE INVENTION

1. Field of Invention

The present invention relates to apparatus and method for controlling data transfer transmitted via radio communication applicable to handheld electronic equipment and electronic equipment communication system. More particularly, the present invention relates to apparatus and method for controlling transfer of system data arranged in a communication unit provided in electronic equipment, such as a handheld computer or a mobile telephone.

2. Discussion of the Background

In recent years, various types of electronic equipment, such as a handheld computer or a notebook type computer, generally referred to herein as a "portable computer," that includes a radio communication unit have been developed in order to transmit/receive data via radio communication among electronic equipments, for example, between a personal computer and a communication terminal, such as a mobile telephone.

These electronic equipments are usually designed to accommodate both power from a battery pack and an AC adaptor. The battery is needed for outdoor use when commercial AC power is unavailable. Usually, when the electronic equipment receives data, such as image data or character data, in the radio communication unit, the received data are arranged in it and it supplies them as system data for processing. Usually, the arranged system data are immediately transferred to the computer unit, i.e., a data processing unit in the electronic equipment, for processing the arranged data.

In order to execute this data processing, the power source needs to be continually supplied both to the radio communication unit and the computer unit in the receiving side electronic equipment. Accordingly, in order to receive the transmitted data at any time, the power source must be supplied to both units from the battery when commercial AC power is unavailable. Consequently, this type of electronic equipment, such as a battery driven type personal computer, has a severe problem of power consumption of the battery since the continuous supply of power to both units for the electronic equipment extremely shortens a battery driven operation time.

In order to save the power consumption for a battery driven portable computer, it has been proposed to continually supply a power source only to the radio communication unit in the electronic equipment for receiving data via radio communication at any time. But the computer unit in the electronic equipment is kept in a power-OFF state or a waiting state when it is not used. In these types of electronic equipment or electronic equipment communication system, when the radio communication unit detects data receipt via radio communication, the radio communication unit requests a power source controller to supply power to the devices in the computer unit, i.e., to change the computer unit into a power ON state, for processing the received data. When the computer unit has been changed to the power ON state by the request, the radio communication unit immediately transfers the received data to the computer unit.

This type of electronic equipment can not immediately execute a transfer of the received data to the computer unit since the radio communication unit must wait until the power drive for the computer unit has changed to the power ON state before data can be transferred, even if the radio communication unit has already completed an arrangement of the received data for providing as system data. Consequently, the conventional electronic equipment cannot receive subsequent data until the previous system data has been transferred to the computer unit. Thus, conventional electronic equipment has a problem of time-lag for receiving data.

The conventional portable electronic equipment has a further problem. Especially, a handheld computer having a radio communication function has a severe problem if it receives data while being vibrated such as occurs during carrying. When the radio communication unit detects data receipt, it requests to drive devices including an HDD in the computer unit. Thus, for storing the transferred data from the radio communication unit, the HDD is driven even when vibration during carrying influences it. This causes serious problems for the HDD. For example, abnormal movement of a head causes data loss. And hitting disks with the head can cause serious damage to the HDD. Accordingly, it is very dangerous to operate the computer unit during an unstable condition.

Therefore, there is a need for apparatus and method to receive data via radio communication at any time and also safely transfer the received data in a data processing unit without damaging an HDD in the electronic equipment. Further, there is a need for apparatus and method to receive data via radio communication at any time without wasting power consumption of battery power in battery driven electronic equipment.

SUMMARY OF THE INVENTION

Accordingly, the present invention is directed to apparatus for controlling transfer of data to electronic equipment that includes a data processing unit and a radio communication unit that is powered independent from the data processing unit, comprising:

means for detecting receipt of data transmitted via radio communication;

a memory for storing the received data in the radio communication unit;

means for determining a state of the data processing unit when the data receipt is detected by the detecting means;

means for requesting start up of the data processing unit if it is determined to be in a non-operating state; and means for transferring the received data stored in the memory to the data processing unit when start up of the data processing unit is complete.

Also in accordance with the present invention, there is provided apparatus for controlling transfer of data between a communication terminal and a computer that includes a data processing unit and a radio communication unit that is powered independent from the data processing unit, comprising:

means for detecting receipt of data transmitted via radio communication in the communication terminal;

a first memory provided in the communication terminal for storing the received data;

means for inquiring as to a state of the data processing unit from the communication terminal via radio communication;

means for determining a state of the data processing unit when the inquiry is received in the computer;

means for requesting start up of the data processing unit if it is determined to be in a non-operating state;

means for sending a notice of completion of the start up of the data processing unit when the start up is complete;

means for transmitting the stored data in the first memory to the computer via radio communication when the communication terminal receives the completion notice; and means for transferring the transmitted received data from the radio communication unit to the data processing unit in the computer.

Further in accordance with the present invention, there is provided a method for controlling data transfer to electronic equipment that includes a data processing unit and a radio communication unit that is powered independent from the data processing unit, comprising the steps of:

detecting receipt of data transmitted via radio communication;

storing the received data in a memory in the radio communication unit;

determining a state of the data processing unit when the data receipt is detected;

requesting start up of the data processing unit if it is determined to be in a non-operating state; and transferring the received data stored in the memory to the data processing unit when start up of the data processing unit is complete.

Additionally, in accordance with the present invention, there is provided a method for communicating data between a communication terminal and a computer that includes a data processing unit and a radio communication unit that is powered independent from the data processing unit, comprising the steps of:

detecting receipt of data transmitted via radio communication;

storing the received data in a memory provided in the communication terminal;

inquiring by the communication terminal via radio communication as to a state of the data processing unit;

determining a state of the data processing unit when the inquiry is received in the computer;

requesting start up of the data processing unit if it is determined to be in a non-operating state;

sending a notice of completion of the start up of the data processing unit when the start up is complete;

transmitting the received data stored in the memory to a radio communication unit of the computer via radio communication when the communication terminal receives the completion notice; and transferring the transmitted received data from the radio communication unit to the data processing unit in the computer.

BRIEF DESCRIPTION OF THE DRAWINGS

A more complete appreciation of the present invention and its many attendant advantages will be readily obtained as the same becomes better understood by reference to the following detailed description when considered in connection with the accompanying drawings, wherein:

FIG. 1 is a perspective view of a handheld computer consistent with the present invention.

DESCRIPTION OF THE PREFERRED EMBODIMENTS

Figure 2A:
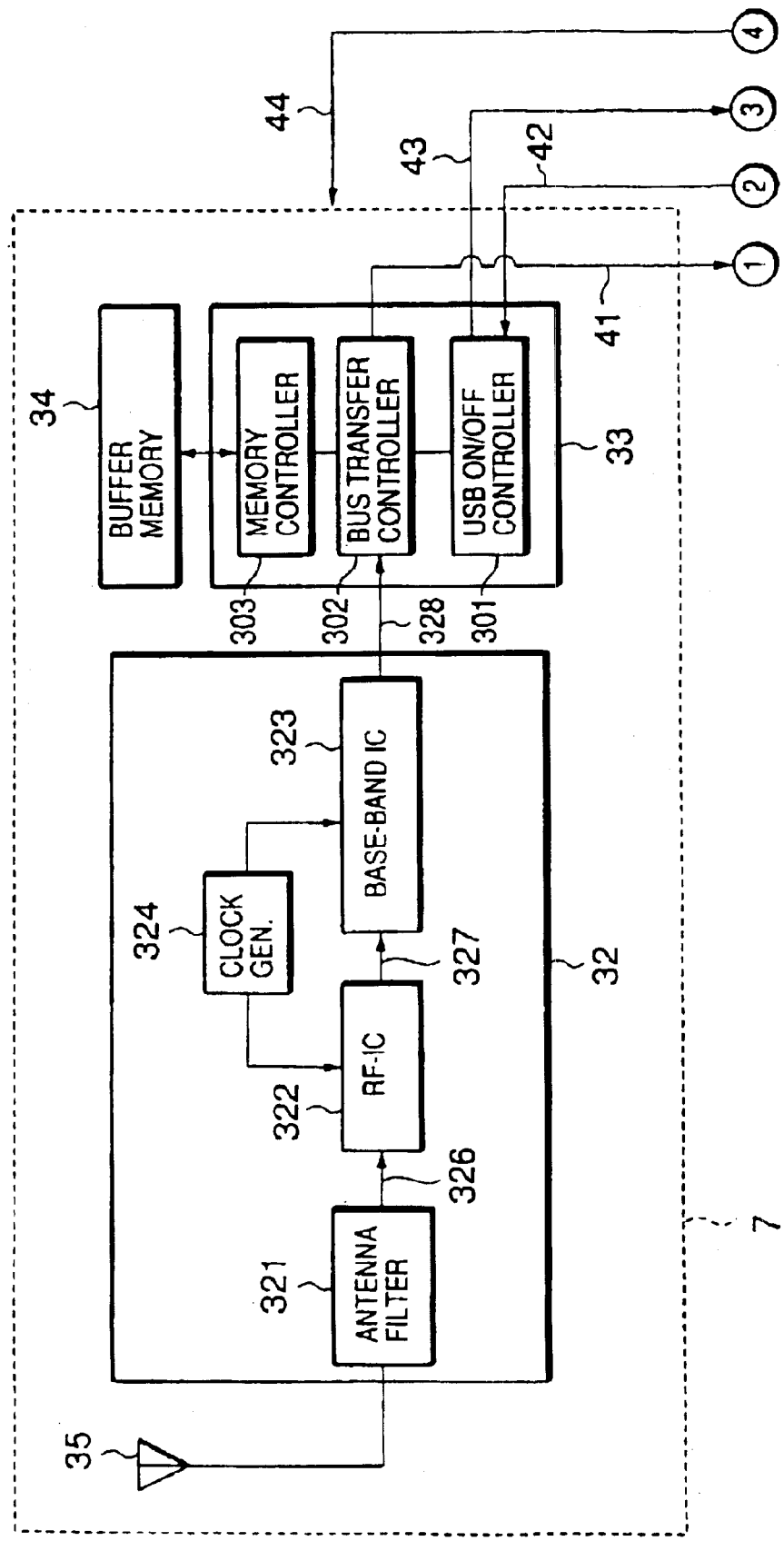
FIG. 2A is a block diagram illustrating components of a radio communication unit in electronic equipment consistent with the present invention.

Embodiments consistent with the present invention overcome the aforementioned problems and defects of conventional apparatus and method for controlling data transfer in electronic equipment or an electronic equipment communication system. Such embodiments comprise apparatus and method for controlling data transfer between a radio communication unit and a computer unit in electronic equipment with high reliability. Such embodiments can also comprise apparatus and method for safely controlling data transfer between a radio communication unit and a computer unit in portable electronic equipment with low consumption of battery power. Also, such embodiments can comprise apparatus and method for controlling a safe data transfer in an electronic equipment communication system, such as communication between a personal computer and a mobile telephone, with high reliability.

Apparatus and method consistent with the present invention overcome the aforementioned problems and defects of the conventional apparatus and method by storing all data transmitted via radio communication as arranged system data in a buffer memory provided in a receiving side electronic equipment and transferring the stored system data with high reliability in a stable state. Thus, apparatus and method for controlling data transfer in electronic equipment or an electronic equipment communication system consistent with the present invention can safely store all of the received data in the buffer memory and can transfer that data to a data processing unit with high reliability. As a result, it is possible to achieve accurate data reception at any time and safely transfer the received data in electronic equipment or electronic equipment communication system without damaging an HDD in a data processing unit.

In apparatus and method for controlling data in electronic equipment consistent with the present invention, a radio communication unit is always driven by a continuous supply of power in order to receive data via radio communication at any time and stores all of the received data as arranged system data if a data processing unit in the electronic equipment is in a non-operable state at the time of the data receipt. Such apparatus and method can achieve reliable transfer of data received via radio communication even when a data processing unit is not driven in the electronic equipment or electronic equipment communication system. The received data can be stored as system data and can be transferred to the data processing unit with high reliability at an appropriate time.

Embodiments consistent with the present invention can use a telecommunication frequency band, for example, between a mobile telephone and a personal computer.

In apparatus and method for controlling transfer of data in electronic equipment or an electronic equipment communication system consistent with the present invention, when data receipt is detected, a data receiving unit receives all data transmitted via radio communication and the received data are arranged as system data and are safely stored in a buffer memory. Simultaneously, the data receiving unit judges or inquires of a state of a data processing unit in the electronic equipment or electronic equipment communication system. If the data processing unit is judged to be in a non-operable state, the arranged system data are safely kept in the buffer memory. When the data processing unit is activated, it requests transfer to it of the stored system data. Consequently, there is no time-lag for receiving transmitted data via radio communication and no data loss during transfer of the system data. Further, it is possible to achieve safe data communication between electronic equipment with low power consumption for a battery driven portable computer.

Referring now to the drawings, wherein like reference numerals designate identical or corresponding parts throughout the several views, and more particularly to FIG. 1 thereof, a portable computer 1 is shown.

The portable computer 1 includes a system unit body 2 and a rotatable display unit 3 that is attached to the system unit body 2 by hinges 6 so as to cover the system unit body 2 when the computer is closed. The system unit body 2 includes a keyboard 5 that includes a plurality of keys provided on a keyboard panel.

Along one elongate edge of the system unit body 2, a mounting portion is provided for attaching the rotatable display unit 3. The display unit 3 includes a display device 4, e.g., a liquid crystal display and a housing for the display screen 4. The system unit body includes a data processing unit 8.

According to the present invention, a radio communication unit 7 is provided in the portable computer 1 for transmitting/receiving data from/to the system unit. For example, the display housing unit 3 further includes the radio communication unit 7 at an appropriate portion in the display housing unit 3. In this embodiment, the radio communication unit 7 is provided as a semiconductor chip. It is also possible to provide the radio communication unit 7 as a PC card that is attached to the data processing unit 2.

As shown in FIG. 2A, the radio communication unit 7 in the electronic equipment includes a data transmitting/receiving device 32, a system data transfer controller 33, a buffer memory 34 and an antenna 35. A power source is continually supplied to the radio communication unit 7 through a power source line 44 to enable continuous receipt of data via radio communication.

The data transmitting/receiving device 32 includes an antenna filter 321, a radio frequency integrated circuit (RF-IC 322, a base band IC 323 and a clock generator (GEN 324.) The antenna filter 321 passes only a necessary frequency band for achieving transmission/receipt of data through the antenna 35. In this embodiment, the predetermined necessary frequency band is, for example, 240~250 GHz.

The RF-IC 322 converts a received analog signal 326 that has been filtered through the antenna filter 321 to a digital signal 327. When data is transmitted through the radio communication unit 7, the RF-IC 322 converts a digital signal from the base-band IC 323 to an analog signal for supplying to the antenna filter 321. For simplification, the following explanation covers the case of data receipt via radio communication. Thus, data flow designated in the radio communication unit 7 only indicates the flow of received data.

The clock generator 324 supplies a reference wave used for the RF-IC 322 and the base band IC 323. The base band IC 323 controls arrangement of the transmitting/receiving data according to a communication protocol, error correction of data and digital signal processing. Thus, a plurality of converted digital signals 327 through the RF-IC 322 are arranged in the base band IC 323 and are supplied to the system data transfer controller 33 as arranged data for processing in a data processing unit (hereinafter referred to as "system data" 328).

The system data transfer controller 33 controls storage of the received system data 328 into the buffer memory 34 and also transfer of the system data to the data processing unit. The system data transfer controller 33 includes a universal serial bus (USB) ON/OFF controller 301, a bus transfer controller 302 and a memory controller 303.

The USB ON/OFF controller 301 judges a status of the data processing unit when the base band IC 323 supplies system data for processing in the data processing unit, i.e., when the data transmitting/receiving device 32 detects data receipt via radio communication, by checking a signal level of an OFF control line 42 coupled to the data processing unit. The USB ON/OFF controller 301 further requests activation of the data processing unit through an ON control line 43 if it judges the data processing unit is in a non-operation state.

The bus transfer controller 302 is coupled to the data processing unit through a universal serial bus (USB) 41 for transferring the arranged system data. The memory controller 303 controls storing and reading the arranged system data into/from the buffer memory 34. The storage capacity of the buffer memory 34 is determined based on a start-up time of an operating system (OS) in a CPU of the data processing unit and a transfer rate of the system data. For example, in order to transfer the system data for a computer system in which the start-up time is 60 seconds and the data transfer rate is about 1 Mbps, the capacity of the buffer memory should be about 8 MB.

Figure 2B:
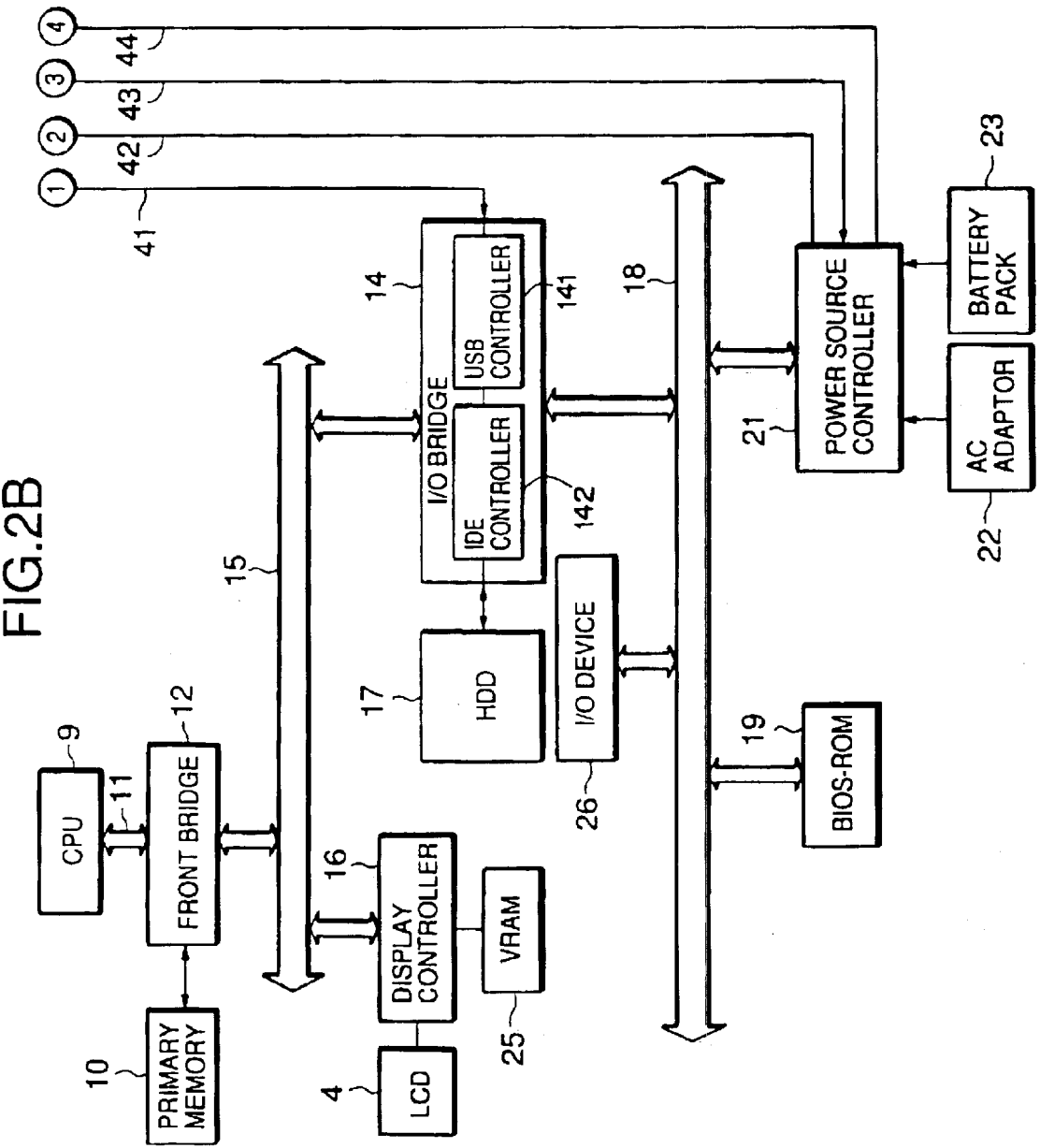
FIG. 2B is a block diagram illustrating components of a data processing unit in the electronic equipment consistent with the present invention.

As shown in FIG. 2B, the data processing unit includes a CPU 9 for controlling total operations and execution of data processing in the system. The CPU 9 is coupled to a primary memory 10 through a CPU local bus 11 and a front bridge 12. The CPU local bus 11 is a data bus having a 64-bit width, it is also possible to couple the CPU 9 and the primary memory 10 with a normal memory bus. The primary memory 10 stores the operating system (OS), a plurality of device drivers, and a plurality of application programs for execution and processing data. The primary memory 10 can be formed of a plurality of DRAMS.

The front bridge 12 is a bridge LSI for coupling among buses. The front bridge 12 couples between the CPU local bus 11 and a peripheral component interconnect (PCI) bus 15. The front bridge 12 has a converting function for a bus width including data and address and an access controlling function to the primary memory 10 through a memory bus. Thus, the front bridge 12 operates as a bus master for the PCI bus 15.

The PCI bus 15 is a clock synchronized type input/output bus having a 32-bit width. Thus, all cycles on the PCI bus 15 are synchronized with a PCI bus clock. The PCI bus 15 includes an address/data bus used by time divisions.

The front bridge 12 is coupled to an I/O bridge 14 and a display controller 16 through the PCI bus 15. The display controller 16 controls a display device, e.g., the LCD panel 4. The display controller 16 is further coupled to a video memory (VRAM) 25 that stores image data for displaying on the LCD panel 4.

The I/O bridge 14 is coupled to a hard disk drive (HDD) 17 and a data bus 18, for example, an industry standard architecture (ISA) bus. Thus, the I/O bridge 14 is a bus transferring bridge LSI between the PCI bus 15 and the ISA bus 18. The HDD 17 is used as a means for storing and reading-out the system data transferred from the radio communication unit 7 through the USB line 41.

Thus, the I/O bridge 14 includes at least a universal serial bus (USB) controller 141 connected to the USB line 41 for controlling serial data transfer and an integrated drive electronics (IDE) 142 controller coupled to the HDD 17 for controlling storage of the transferred data.

The data bus 18 is, for example, an ISA bus 18 of 16-bit width. A BIOS-ROM 19, a power source controller 21 and I/O devices 26 are coupled to the data bus 18. The BIOS-ROM 19 stores a system BIOS including a utility application for controlling ON/OFF operation of the power source. Thus, the system BIOS is firmware for a plurality of function executing routines for accessing various hardware in the data processing unit. The system BIOS comprises re-loadable flash memory in order to enable rewriting the routines.

The power source controller 21 controls the supply of power to each of the devices in the computer 1. A commercial power source is supplied to the computer 1 through an AC adaptor 22 coupled to the power source controller 21. When the commercial power source is not available, for example, while carrying the computer 1, the power source for using the computer 1 is supplied from a battery pack 23 through the power source controller 21.

As explained above, the radio communication unit 7 is continually supplied with a power source through the power source line 44 from the power source controller 21 to enable always receiving data via radio communication even when the data processing unit is in an non-operable state, e.g., a power OFF state, for saving the power of the battery pack 23.

In order to enter the power OFF state of the data processing unit, the power source controller 21 sends a request to the USB ON/OFF controller 301 in the radio communication unit 7, through the OFF control line 42, to disconnect the USB bus 41. Thus, when the data processing unit is in the non-operable state, it becomes impossible to transfer system data arranged in the base-band IC 323 into the data processing unit through the USB bus 41.

In this embodiment, the power source controller sends a request of one bit for disconnecting the USB bus 41 through the OFF control line 42. For example, when requesting disconnecting the USB bus 41, the power source controller 21 changes the OFF control line 42 from a "high" level to a "low" level.

Consequently, by checking the signal level of the OFF control line 42, the system data transfer controller 33 can judge whether the data processing unit is in an operable state or in a non-operable state. When the system data transfer controller 33 judges that the data processing unit is in a non-operable state, the arranged system data 328 is stored in the buffer memory 34 through the bus transfer controller 302 and the memory controller 303.

Then, the USB ON/OFF controller 301 in the system data transfer controller 33 sends a request to the power source controller 21 through the ON control line 43 to start up the data processing unit. In this embodiment, the USB ON/OFF controller 301 sends a request of one bit to the power source controller 21 through the ON control line 43 to start up the data processing unit. For example, to request driving of the computer system, the USB ON/OFF controller 301 changes the ON control line 43 from a "low" level to a "high" level.

When starting up the data processing unit has been completed, the signal state of the OFF control line 42 is changed to a "high" level. By detecting the "high" level of the OFF control line 42, the USB ON/OFF controller 301 connects the system data transfer controller 33 and the I/O bridge 14. Then, the bus transfer controller 302 transfers the system data stored in the buffer memory 34 to the HDD 17 or the primary memory 10 in the data processing unit through the USB bus 41 and the I/O bridge 14. Thus, when both of the OFF control line 42 and the ON control line 43 are in the high level state, it becomes possible to transfer the system data from the radio communication unit to the data processing unit through the USB bus 41.

Figure 3:
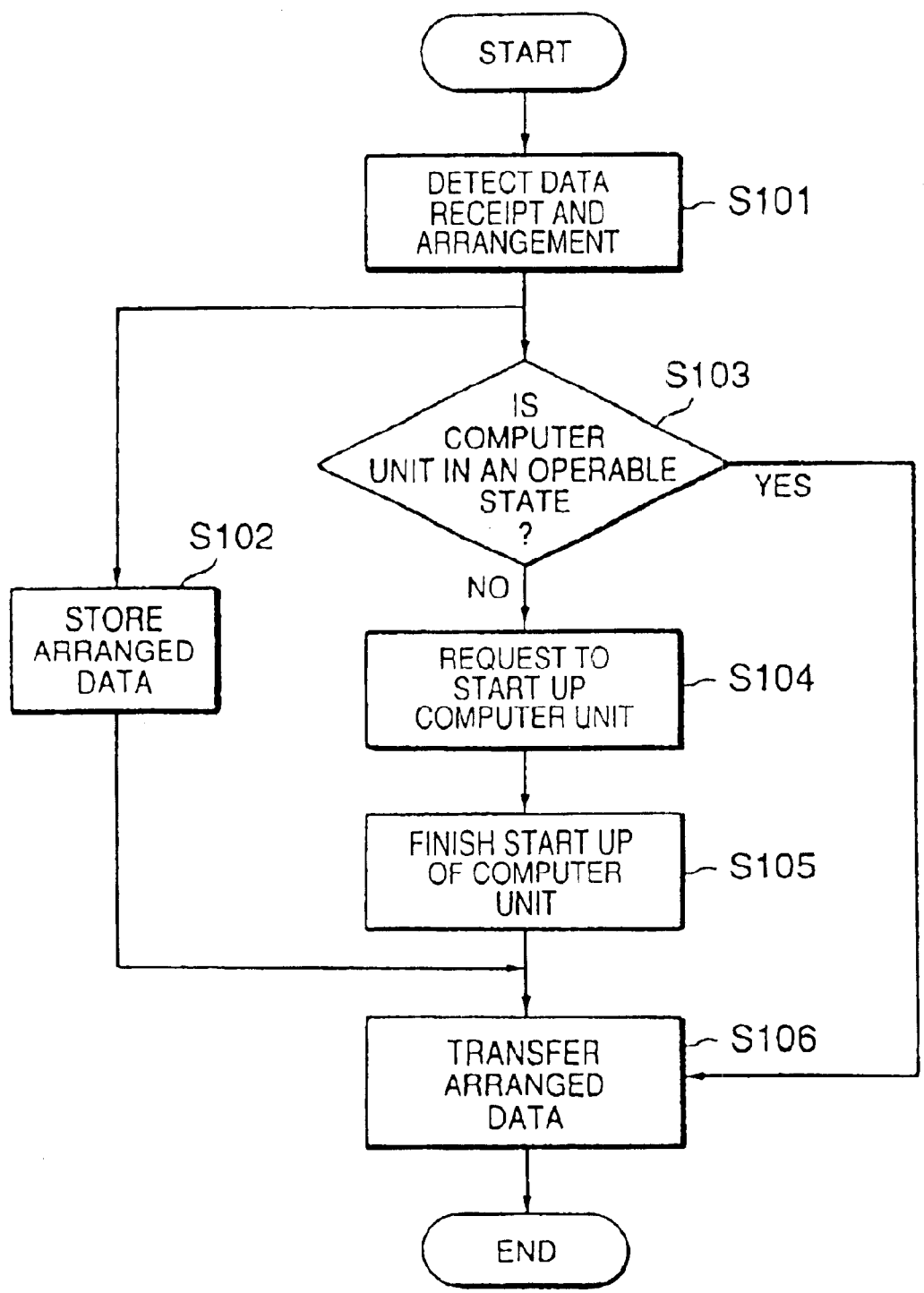
FIG. 3 is a flowchart illustrating a data receiving operation in the radio communication unit in the electronic equipment shown in FIG. 2A according to a first embodiment of the present invention.

With reference to FIG. 2A and the flowchart shown in FIG. 3, the data receiving operations in the radio communication unit 7 in the computer 1 according to a first embodiment are explained. When the radio communication data are received through the antenna 35, the base-band IC 323 stores the data and arranges them into system data. After completion of arranging the system data, the data transmitting/receiving device 32 sends them to the system data transfer controller 33. Thus, the data transmitting/receiving device 32 detects the completion of arranging the system data (Step S101) and the system data transfer controller 33 stores the system data into the buffer memory 34 through the bus transfer controller 302 and the memory controller 303 (Step S102).

Then, the system data transfer controller 33 judges the state of the data processing unit 8 by checking the signal level of the OFF control line 42 (Step S103). If the system data transfer controller 33 judges that the data processing unit 8 is in a non-operable state (Step S103, NO), the system data transfer controller 33 sends a request for connecting the USB bus to the data processing unit 8 from the USB ON/OFF controller 301 to the power source controller 21 by changing the ON control line 43 to a high level (Step S104). When the power source controller 21 receives the USB bus connecting request through the ON control line 43, the power supply to each of the devices in the data processing unit 8 is provided from the power source controller 21 under control of the OS in the CPU 9. Thus, the data processing unit is started up and driven to an operable state. When the start up of the data processing has completed, the power source controller 21 sends a start up completion signal to the system data transfer controller 33 in the radio communication unit 7 by changing the OFF control line 42 to a high level. By detecting the level change of the OFF control line 42 at the USB ON/OFF controller 30, the system data transfer controller 33 receives the start up completion signal of the data processing unit (Step S105). Then the USB ON/OFF controller 30 connects the USB bus 41. After connecting the bus transfer controller 302 and the I/O bridge 14, the system data stored in the buffer memory 34 is transferred to the data processing unit through the USB bus 41 (Step S106).

The transferred system data is stored in the HDD 17 through the USB controller 141 and the IDE controller 142 in the I/O bridge or in the primary memory 10 through the PCI bus 15 and the front bridge 12, depending upon the system data.

In the first embodiment, when the system data transfer controller 33 detects the completion of arranging the system data, it immediately requests start up of the data processing unit 8 in order to immediately transfer the system data stored in the buffer memory 34 to the system unit after completion of the start up.

It is also possible to modify the sending of a request for driving the data processing unit only when an amount of the arranged system data exceeds the predetermined capacity of the buffer memory 34. Thus, it is possible to store all of the arranged system data into the buffer memory 34 so long as the data amount does not exceed the capacity of the buffer memory 34. Consequently, a user can use the stored system data at any time by driving the data processing unit when a user is available.

Further, it is possible to store all of the data that are received while carrying the computer without driving the HDD in the computer in order to prevent damage to the HDD due to vibrations. When the computer is placed in a stable condition, it can request transfer of the stored data in the buffer memory to the data processing unit.

Thus, battery driven electronic equipment according to the present invention can always receive data transmitted via radio communication even when the data processing unit in the electronic equipment is in a power OFF state for saving the battery power by storing the arranged system data into buffer memory. Consequently, when the data processing unit is driven, the system data can be reliably processed.

Figure 4:
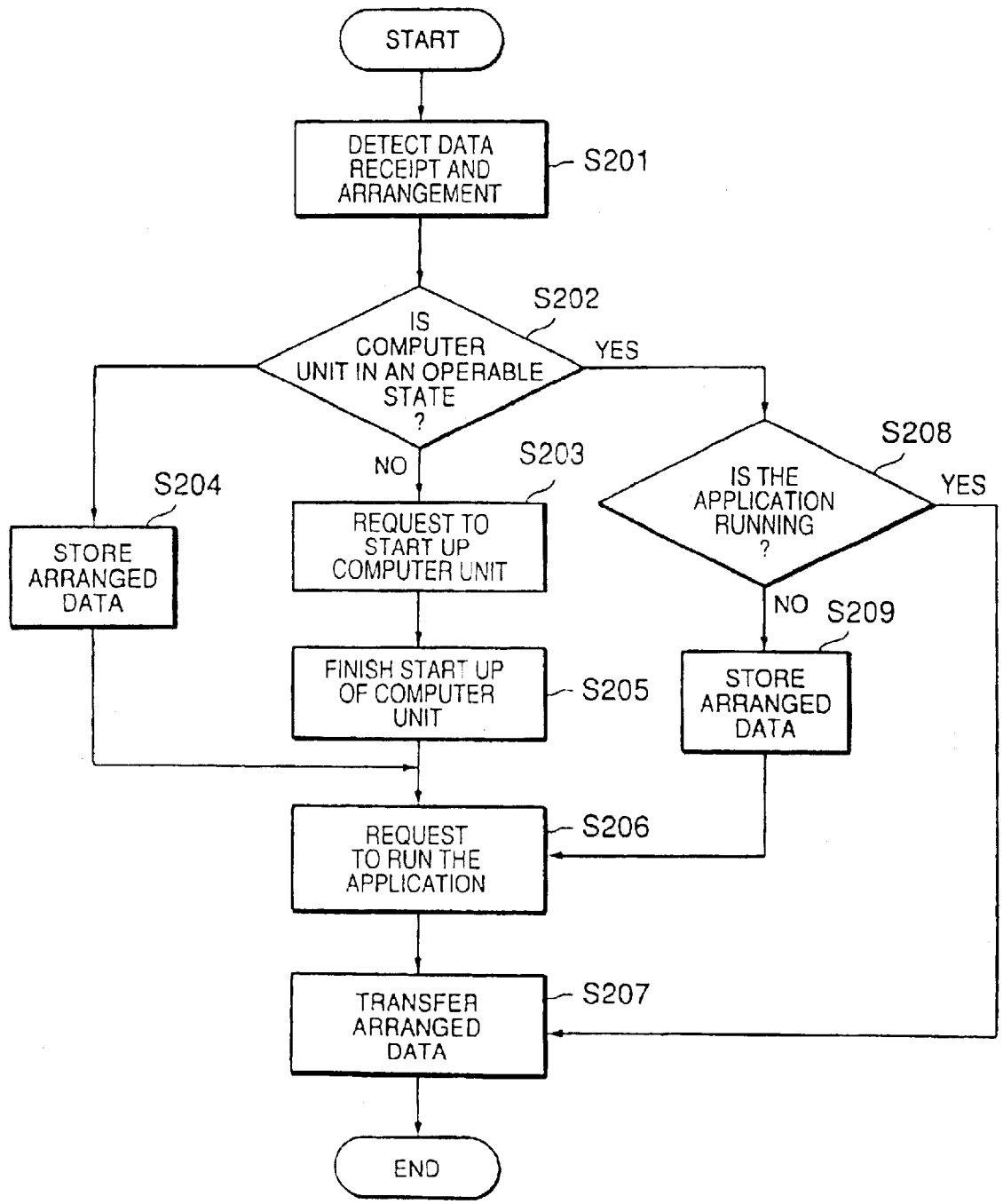
FIG. 4 is a flowchart illustrating data receiving operation in the radio communication unit in the electronic equipment according to a second embodiment of the present invention.

FIG. 4 explains a second embodiment of electronic equipment according to the present invention. In this embodiment, a particular application software is loaded for processing the received data in the radio communication unit. The construction of the electronic equipment in this embodiment is basically the same as for the first embodiment, shown in FIGS. 2A and 2B.

Thus, the power source is continually supplied to the radio communication unit in the electronic equipment so the unit can always receive data transmitted via radio communication. But the power source to the data processing unit in the electronic equipment does not always supply power, so battery power can be saved. In the second embodiment, even when the data processing unit in the electronic equipment has been started up, it further needs to run a particular application software for processing the system data arranged in the radio communication unit.

As shown in FIG. 4, when the system data transfer controller 33 detects a completion of arrangement of the received data via radio communication (Step S201), the system data transfer controller 33 judges the state of the data processing unit 8 by checking the signal level of the OFF control line 42 (Step S202). If the system data transfer controller 33 judges that the data processing unit 8 is in a non-operable state (Step S202, NO), the system data transfer controller 33 stores the system data into the buffer memory 34 through the bus transfer controller 302 and the memory controller 303 (Step S204).

Further, the system data transfer controller 33 sends a request, to connect the USB bus to the data processing unit 8, from the USB ON/OFF controller 301 to the power source controller 21 by changing the ON control line 43 to a high level (Step S203). When the power source controller 21 receives the USB bus connecting request through the ON control line 43, the power supply to each of the devices in the data processing unit is provided from the power source controller 21 under control of the OS in the CPU 9. Thus, the data processing unit is started up to be driven to an operable state. When the start up of the data processing unit is completed, the power source controller 21 sends a start up completion signal to the system data transfer controller 33 in the radio communication unit 7 by changing the OFF control line 42 to a high level. When the start up completion signal of the data processing unit is received (Step S205), the system data transfer controller 33 sends a request for running a particular application corresponding to the system data from the USB ON/OFF controller 301 to the USB controller 141 in the I/O bridge 14 (Step S206). When the requested application is running, the USB ON/OFF controller 301 connects the USB bus 41 and the system data stored in the buffer memory 34 is transferred to the data processing unit through the USB bus 41 (Step S207).

At the judging step S202, if the data processing unit 8 is in an operable state (Step S202, YES), the radio communication unit asks the data processing unit whether or not a particular application for processing the system is running (Step S208). If the particular application corresponding to the system data is running (Step S208, YES), the system data stored in the buffer memory 34 is transferred to the data processing unit through the USB bus 41 (Step S207).

If the particular application corresponding to the system data is not running (Step S208, NO), the system data are stored in a memory (Step S209). In this case, it is possible to store the system data in either one of the buffer memory 34, the HDD 17, or the primary memory 10 depending upon the data (Step S209). Then, the system data transfer controller 33 sends a request to run a particular application corresponding to the system data from the USB ON/OFF controller 301 to the USB controller 141 in the I/O bridge 14 (Step S206). After completion of the start up of the application, the stored data in the memory are read out for processing (Step S207). If the particular application has been running (Step S208, YES), the system data are immediately transferred for processing (Step S207).

According to this embodiment, it is possible to transfer the system data even when a particular application corresponding to the system data has not yet run. Consequently, it can improve the reliability as a communication device.

Figure 5:
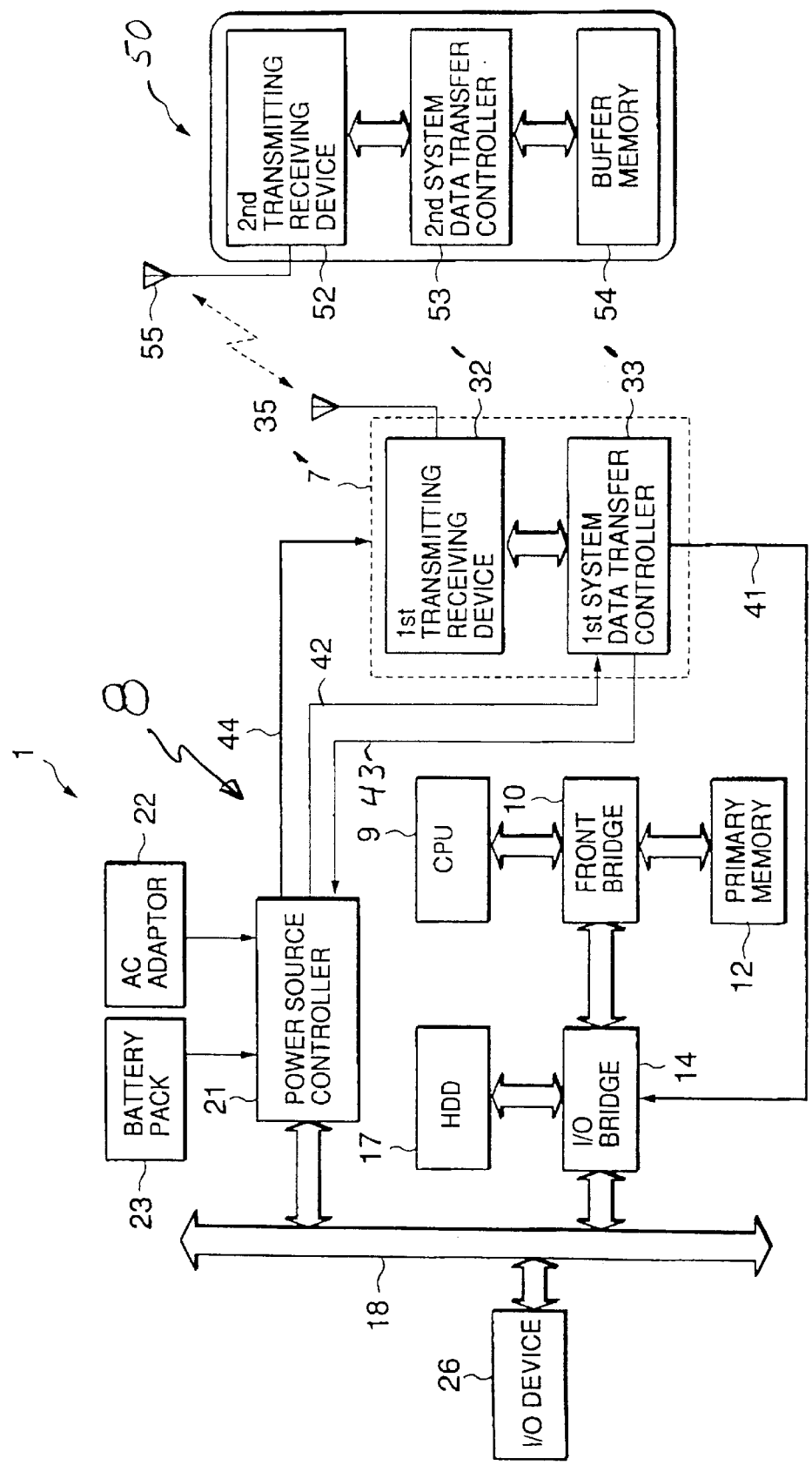
FIG. 5 is a block diagram illustrating components of the electronic equipment communication system according to a preferred embodiment of the present invention.

FIG. 5 shows an electronic equipment communication system in a preferred embodiment of the present invention. The electronic equipment communication system includes, for example, a personal computer 1 and a mobile telephone 50 as a communication terminal for transferring data between them by using a frequency band for telecommunication. The personal computer 1 includes a function for identifying an individual communication that has previously registered in the computer as a front end of the radio communication. Thus, the computer can transfer data to and from the front telephone terminal by using a frequency band for the radio communication.

The electronic equipment communication system shown in FIG. 5 can transmit data, e.g., image data or character data, via radio communication between electronic equipment, such as the personal computer 1 and a communication terminal, e.g., the mobile telephone 50. For simplifying the explanation, the following explanation covers a case of data transfer from the mobile telephone 50 to the computer 1 though a radio communication unit 7'. For example, the telephone 50 transmits received data in it after arranging the data in the radio communication unit 7' in the computer 1 via radio communication by using a frequency band, e.g., 240~250 GHz for telecommunication.

As in the first embodiment, the personal computer 1 includes the radio communication unit 7' and the data processing unit 8 that are substantially similar to the corresponding elements in the embodiment shown in FIGS. 2A and 2B, respectively. The components shown in FIG. 5 are designated with the same reference numerals as the elements in FIG. 2B to obviate the need to repeat their description. The radio communication unit 7' includes a first data transmitting/receiving device 32', a first system data transfer controller 33' and the antenna 35.

The power source controller 21 continually supplies power to the radio communication unit 7' even when the data processing unit 8 is in a non-operable state and the USB bus 41 is disconnected by the first system data transfer controller 33'. In this state, the mobile telephone 50 receives data for transmitting to the computer 1.

The mobile telephone 50 includes an antenna 55, a data transmitting/receiving device 52, a second system data transfer controller 53 for controlling the second data transmitting/receiving device 52, and a buffer memory 54 for storing the received data, such as image data or character data.

Figure 6:
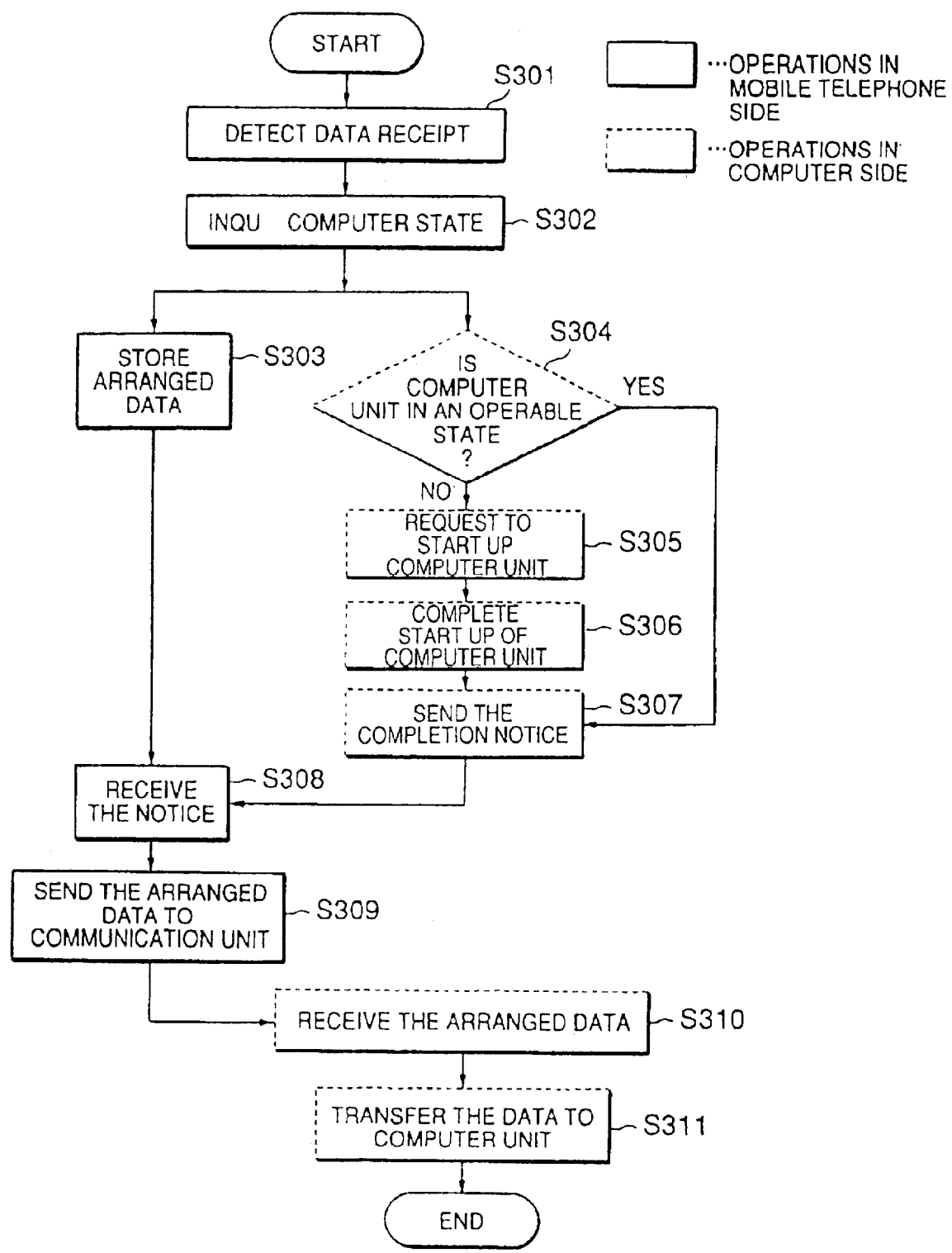
FIG. 6 is a flowchart illustrating a data transfer operation between a mobile telephone and a personal computer in the electronic equipment communication system shown in FIG. 5.

With reference to FIGS. 5 and 6, the data transfer operation between the electronic equipment communication system is described. In FIG. 6, the solid line blocks show operations in the mobile telephone side and the dotted line blocks are operations in the computer side.

When the mobile telephone 50 detects data receipt that needs to be transmitted to the computer 1 at the second transmitting/receiving device 52 (Step S301), the second data transfer controller 53 inquires to the radio communication unit 7' in the computer 1 via a frequency band used for telecommunication as to the operable state of the data processing unit 8 (Step S302). The second data transfer controller 53 in the mobile telephone 50 stores the received data in the buffer memory 54 after arranging it into system data (Step S303).

When the radio communication unit 7' in the computer 1 receives the inquiry through the first antenna 35 and the first data transmitting/receiving device 32', the first data transfer controller 33' judges the operable state of the data processing unit 8' by examining the signal level of the OFF control line 42 (Step S304).

If the first data transfer controller 33' judges that the computer unit is in a non-operable state (Step S304, NO), the first data transfer controller 33' requests the power source controller 21 to start up the data processing unit 8' by changing the ON control line 43 to a "high" signal level (Step S305).

When the start up of the data processing unit 8 is complete, e.g., the power source controller 21 has provided a supply of power to each device in the data processing unit 8, the power source controller 21 changes the OFF control line 42 to a high signal level. Thus, the first system data transfer controller 33' detects the completion of the start up of the data processing unit 8' by the change of the OFF control line 42 (Step S306). Then the radio communication unit 7' sends a completion notice to the mobile telephone 50 from the antenna 35 by using the telecommunication frequency band (Step S307).

When the notice is received (Step S308), the mobile telephone 50 sends the stored system data in the buffer memory 54 to the radio communication unit 7' via radio communication (Step S309).

When the arranged system data are received in the radio communication unit 7' (Step S310), the first data transfer controller immediately transfers the system data to the computer unit through the USB bus 41 for processing the data (Step S311).

Figure 7:
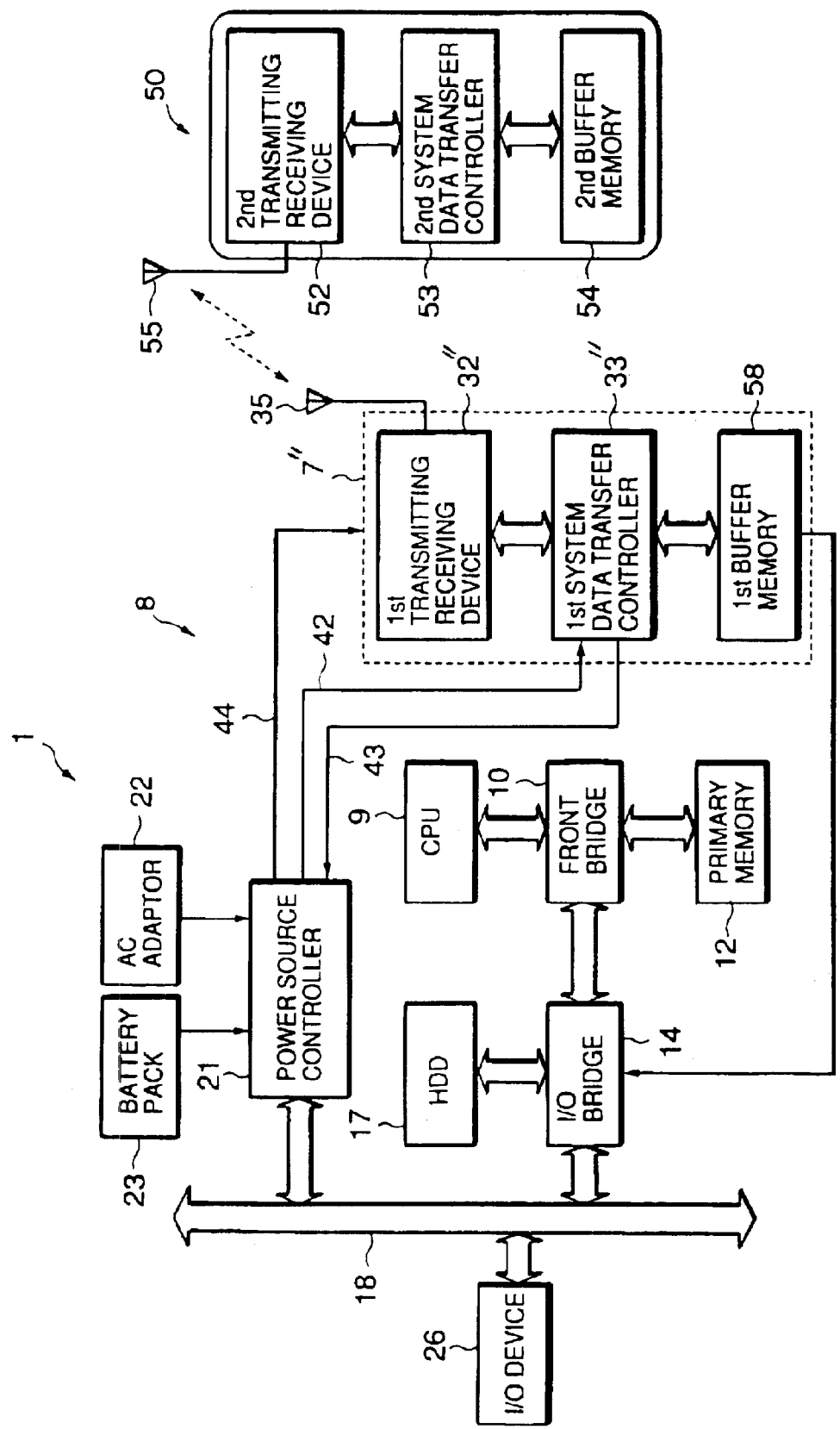
FIG. 7 is a block diagram illustrating components of the electronic equipment communication system according to the second embodiment of the present invention.

FIG. 7 shows a modification of the electronic equipment communication system shown in FIG. 5. In the electronic equipment communication system in FIG. 7, a radio communication unit 7" in the computer 1 includes a first buffer memory 58 in order to store the transmitted system data from the mobile telephone 50. Thus, in this embodiment of the electronic equipment communication system, a mobile telephone 50 can transmit the system data immediately after arranging the received data in it without inquiring about the state of the data processing unit 8. Accordingly, it is not necessary to provide the buffer memory in the mobile telephone side.

However, it is also possible to include the buffer memory 54 in the mobile telephone 50 such as shown in FIG. 7. In this case, when an amount of the immediately transmitted data from the mobile telephone 50 to the computer 1 exceeds the capacity of the buffer memory 50 in the computer 1, the mobile telephone 50 can store the remaining system data in the buffer memory 54 in the mobile telephone 50.

When buffer memory is provided in both the radio communication unit for the computer and the mobile telephone, it is not necessary to immediately start up the computer unit when the radio communication unit in the computer system receives the data transmitted from the mobile telephone. Consequently, it becomes possible to start up the computer unit for transferring the stored data in the buffer memory after the computer system is in a stable state to avoid running during an unstable state, such as when the system is being carried. Thus, the electronic equipment communication system according to the present invention can communicate the arranged system data between two electronic equipment when one equipment receives the data and it also becomes possible to process the arranged system data in the other equipment at any time, so long as the transmitted data amount does not exceed the capacity of the buffer memory in the other equipment.

Figure 8:
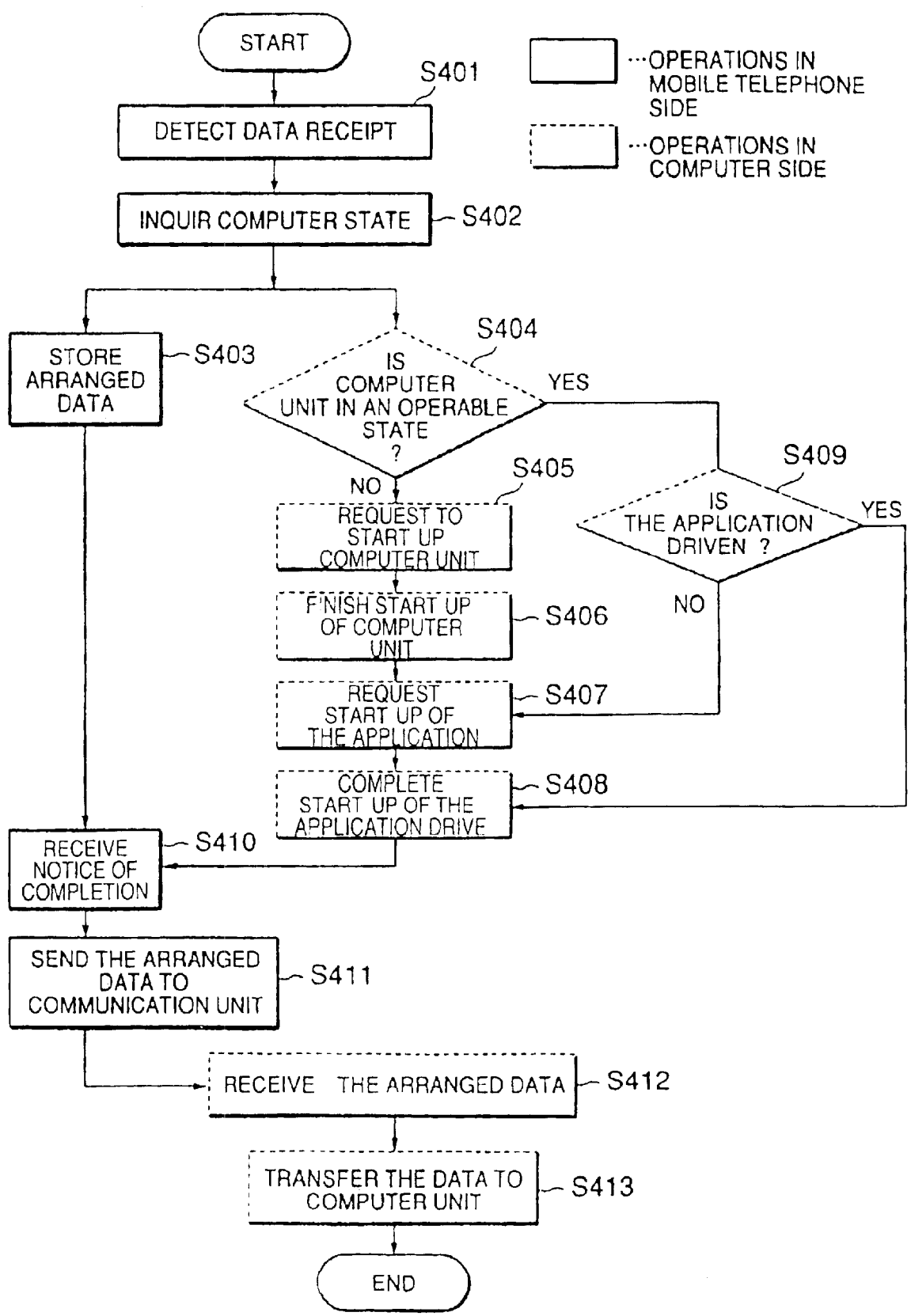
FIG. 8 is a flowchart illustrating a data transfer operation between the mobile telephone and the personal computer in the electronic equipment communication system shown in FIG. 7.

FIG. 8 illustrates a flow chart of another embodiment of the electronic equipment communication system according to the present invention. In this embodiment, in a manner similar to the embodiment explained in FIG. 4, it is necessary to run a particular application software corresponding to the transferred data in a computer unit of a data receiving side electronic equipment. Thus, when the computer 1 shown in FIG. 7 receives arranged data from the mobile telephone 50, the computer 1 cannot process the received data without running the application corresponding to the received data even when the computer unit is in an operable state at that time.

In FIG. 8, the solid line blocks show operations in the data transmitting side electronic equipment, e.g., the mobile telephone 50 such as shown in FIG. 7, and the dotted line blocks are operations in a communication unit in a data receiving side electronic equipment, e.g., the computer 1, such as shown in FIG. 7.

When the mobile telephone 50 detects data receipt that needs to be transmitted to the computer 1 at the second transmitting/receiving device 52 (Step S401), the second data transfer controller 53 in the mobile telephone 50 inquires to the radio communication unit 7" in the computer 1 via a frequency band used for telecommunication as to the operable state of the data processing unit 8 (Step S402). Simultaneously, the second data transfer controller 53 in the mobile telephone 50 stores the received data in the buffer memory 54 after arranging the received data into system data (Step S403).

When the computer 1 receives the inquiry from the telephone 50 through the first antenna 35 and the first data transmitting/receiving device 32", the first data transfer controller 33" in the radio communication unit 7" of the computer 1 judges the operable state of the data processing unit 8 by examining the signal level of the OFF control line 42 (Step S404).

If it judges that the computer unit is in a non-operable state (Step S404, NO), the first data transfer controller 33" requests the power source controller 21 to start up each device in the computer unit by changing the signal level of the ON control line 43 to "high" (Step S405).

When the start up of the data processing unit is complete, the signal level of the OFF control line 42 coupled to the power source controller 21 changes to "high". Thus, the first system data transfer controller 33" in the communication unit 7" detects the completion of the start up of the computer unit (Step S406). On the other hand, in the computer unit, an OS in the CPU requires generating an object application corresponding to the data (S407). When the corresponding object application has been started, the radio communication unit 7" sends a notice of the completion of the start up to the mobile telephone 50 through the antenna 35 by using the telecommunication frequency band (Step S408).

When the completion notice of the start up is received (Step S410), the mobile telephone 50 sends the stored system data in the buffer memory 54 to the computer 1 via radio communication (Step S411).

In the computer 1, when the radio communication unit 7" receives the system data (Step S412), the first data transfer controller 33" immediately transfers the system data to the computer unit through the USB bus 41 for processing the data (Step S413).

On the other hand, if the computer unit is in an operable state When it received the inquiry (Step S404, YES), the OS in the computer unit examines whether a application corresponding to the transferred data has been started (Step S409). If the corresponding object application has not yet been started (Step S409, NO), the OS in the computer unit requires the start up of the object application for processing the transferred data (Step S407). If the corresponding object application has been started (Step S409, YES), the radio communication unit 7" sends a notice of the completed start up for processing the data to the mobile telephone 50 through the antenna 35 by using the telecommunication frequency band (Step S408). The subsequent steps are the same as explained above.

In the electronic equipment communication system according to this embodiment of the present invention, when a small radio communication terminal such as a mobile telephone is used for transmitting data in the communication system, it can store the received data in the buffer memory without considering either the states of the computer unit or the object application in the receiving side electronic equipment. Consequently, it becomes possible to improve the reliability of the electronic equipment communication system.

As explained above, according to the present invention, it is possible to improve the reliability of the electronic equipment or the electronic equipment communication system by continually receiving the data via radio communication in electronic equipment at any time while avoiding data loss during data transfer and also avoiding consumption of battery power. Further, any damage to an HDD can be avoided in the computer unit due to data transfer during an unstable condition.

Numerous modifications and variations of the present invention are possible in light of the above teaching. It is therefore to be understood that within the scope of the appended claims, the invention may be practiced otherwise than as specifically described herein.

What is claimed is:

1. A method for controlling data transfer to electronic equipment that includes a data processing unit and a radio communication unit that is powered independent from the data processing unit, comprising the steps of:

detecting receipt of data transmitted via radio communication;

storing the received data in a memory in the radio communication unit;

determining a state of the data processing unit when the data receipt is detected;

requesting start up of the data processing unit if it is determined to be in a non-operating state; and transferring the received data stored in the memory to the data processing unit when start up of the data processing unit is complete.

2. The method according to claim 1, further comprising the steps of:

examining a state of an application corresponding to the received data when the data processing unit is determined to be in an operating state; and storing the received data in one of the memory in the communication unit, or in a primary memory or an HDD in the data processing unit when the application has not yet run.

3. A method for communicating data between a communication terminal and a computer that includes a data processing unit and a radio communication unit that is powered independent from the data processing unit, comprising the steps of:

detecting receipt of data transmitted via radio communication;

storing the received data in a memory provided in the communication terminal;

inquiring by the communication terminal via radio communication as to a state of the data processing unit;

determining a state of the data processing unit when the inquiry is received in the computer;

requesting start up of the data processing unit if it is determined to be in a non-operating state;

sending a notice of completion of the start up of the data processing unit when the start up is complete;

transmitting the received data stored in the memory to a radio communication unit of the computer via radio communication when the communication terminal receives the completion notice; and transferring the transmitted received data from the radio communication unit to the data processing unit in the computer.

4. The method according to claim 3, further comprising the steps of:

storing the transmitted received data from the radio communication unit in a second buffer provided in the computer; and transferring the stored received data into a memory provided in the data processing unit when the computer is in a stable condition.

5. The method according to claim 3, further comprising the steps of:

examining a state of an application corresponding to the received data when inquiring as to the state of the computer;

requesting start up of the application when the data processing unit is in an operating state; and sending a notice of completion of the start up of the application unit from the computer to the communication terminal when the application start up is completed.

6. The method according to claim 5, further comprising the steps of:

storing the transmitted received data in buffer a memory provided in the data processing unit; and transferring the stored received data in the buffer memory to the data processing unit when the computer is in a stable operation state.

7. Apparatus for controlling transfer of data to electronic equipment that includes a data processing unit and a radio communication unit that is powered independent from the data processing unit, comprising:

means for detecting receipt of data transmitted via radio communication;

a memory for storing the received data in the radio communication unit;

means for determining a state of the data processing unit when the data receipt is detected by the detecting means;

means for requesting start up of the data processing unit if it is determined to be in a non-operating state; and means for transferring the received data stored in the memory to the data processing unit when start up of the data processing unit is complete.

8. The apparatus according to claim 7, further comprising:

means for examining a state of an application corresponding to the received data when the data processing unit is determined to be in an operating state; and means for controlling storage of the received data into one of the memory in the communication unit, or in a primary memory or an HDD in the data processing unit when the application has not yet run.

9. Apparatus for controlling transfer of data between a communication terminal and a computer that includes a data processing unit and a radio communication unit that is powered independent from the data processing unit, comprising:

means for detecting receipt of data transmitted via radio communication in the communication terminal;

a first memory provided in the communication terminal for storing the received data;

means for inquiring as to a state of the data processing unit from the communication terminal via radio communication;

means for determining a state of the data processing unit when the inquiry is received in the computer;

means for requesting start up of the data processing unit if it is determined to be in a non-operating state;

means for sending a notice of completion of the start up of the data processing unit when the start up is complete;

means for transmitting the stored data in the first memory to the computer via radio communication when the communication terminal receives the completion notice; and means for transferring the transmitted received data from the radio communication unit to the data processing unit in the computer.

10. The apparatus according to claim 9, further comprising:

a second memory provided in the communication unit in the computer for storing the received data transmitted from the communication terminal; and reading the stored received data in the second memory when the computer is in a stable condition.

11. The apparatus according to claim 9, further comprising:

means for examining as to a state of an application corresponding to the received data when the inquiry is received in the computer;

means for requesting start up of the application when the data processing unit is in an operating state; and means for sending a notice of completion of the start up of the application from the computer to the communication terminal when the application start up is completed.

12. In a portable computer including a data processing unit and a continually powered radio communication unit, the radio communication unit comprising:

a device for transmitting/receiving data via radio communication;

a memory for storing the data;

a USB ON/OFF controller for determining an operating state of the data processing unit and requesting start up of the data processing unit when the data processing unit is determined to be in a non-operating state;

a memory controller for controlling writing/reading the data in the memory; and a bus transfer controller for controlling transfer of the data from the radio communication unit to the data processing unit based on the determination of the USB ON/OFF controller.

* * * * *